June 23, 1959 R. J. BARRETT 2,891,825
ADJUSTABLE STRUT AND BEARING FOR BOAT SHAFTS
Filed Nov. 30, 1955 2 Sheets-Sheet 1

INVENTOR
Robert J. Barrett

BY *Munn, Liddy, Daniel & March*
ATTORNEYS

June 23, 1959   R. J. BARRETT   2,891,825
ADJUSTABLE STRUT AND BEARING FOR BOAT SHAFTS
Filed Nov. 30, 1955   2 Sheets-Sheet 2
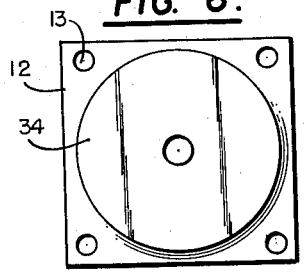
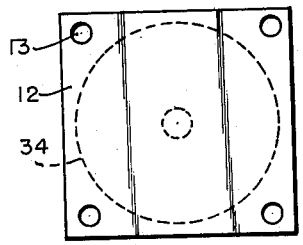
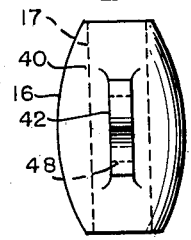
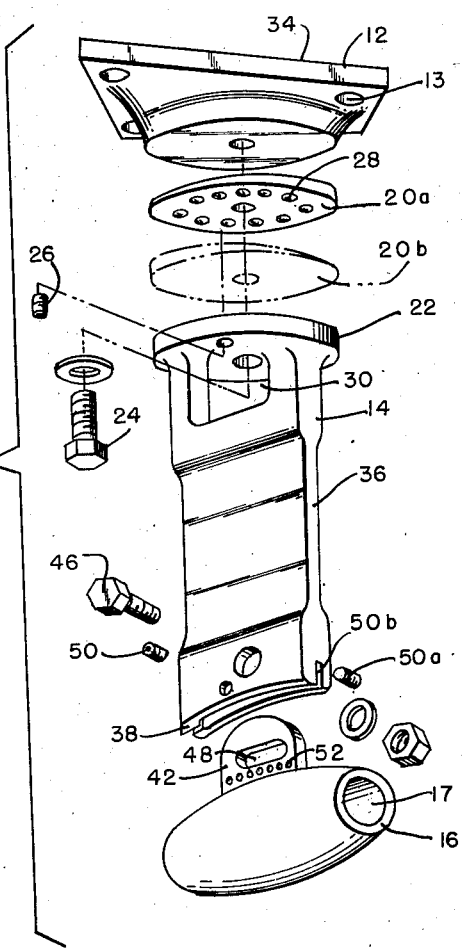
INVENTOR
Robert J. Barrett
BY
ATTORNEYS

United States Patent Office 2,891,825
Patented June 23, 1959

2,891,825

ADJUSTABLE STRUT AND BEARING FOR BOAT SHAFTS

Robert J. Barrett, Burlington, Vt.

Application November 30, 1955, Serial No. 550,143

5 Claims. (Cl. 308—32)

The present invention relates to improvements in shaft-hangers and strut and bearing assemblies, and more particularly to an adjustable strut and bearing assembly for supporting propeller shafts in power boats.

Heretofore, difficulty has been experienced in the use of conventional strut and bearing assemblies and shaft-hangers due to the fact that, after their initial installation, the component parts thereof were not readily adjustable relative to the shaft supported or suspended by the strut or shaft-hanger. Maintenance of the conventional shaft-hangers and their associated shafts was therefore rendered expensive and time consuming as a result of difficulties encountered in realignment after the installation thereof as necessitated by wear or accident. Frequently, known shaft-hangers had to be replaced in their entirety since they were not readily adjustable to compensate for ordinary wear or for distortion resulting from abuse or accident. Furthermore the difficulty of disassembling and realigning conventional strut and bearing assemblies rendered impractical the carrying of spare parts therefor, as replacements for parts often damaged or destroyed by accidentally running aground or striking submerged objects. Moreover conventional strut assemblies usually required dismantling the propeller-shaft of the power boat in order to replace the worn or damaged bearing or other component parts of the strut assembly. In the event that a power boat was provided with two or more screws, the structures of known strut and bearing assemblies required the manufacture of opposite or right- and left-hand parts for the assemblies associated with the respective propeller shafts.

Accordingly, it is an object of the present invention to provide a strut and bearing assembly or shaft-hanger which is readily adjustable in all directions relative to the shaft associated therewith.

Another object is the provision of means in an adjustable strut assembly for adapting the strut for use with either left- or right-hand propeller shafts of a multiple screw power boat.

A further object is the provision of an adjustable strut and bearing assembly or shaft-hanger having a minimum of component parts.

Still other objects are the provision in a shaft-hanger of means for readily realigning the shaft-hanger with its associated shaft after the initial installation thereof, of means for facilely assembling and disassembling the shaft-hanger or strut assembly, and of means, including a part having a weakened portion, for preventing damage to more expensive parts associated with the shaft-hanger or strut and, in the case of power boats or other vehicles, to those parts less easily replaced or carried as spares.

Other objects and advantages of the invention will be apparent from the ensuing description of illustrative forms thereof, as applied to power boats, said description taken in conjunction with the accompanying drawings in which:

Fig. 6 is a view taken along line 6—6 of Fig. 1.

Fig. 7 is a top plan view of member 12 of Fig. 1.

Fig. 8 is a top plan view of the bearing housing 16 of Fig. 1.

Fig. 10 is an exploded perspective view of another illustrative form of the strut and bearing assembly made in accordance with the instant invention.

Figure 1:
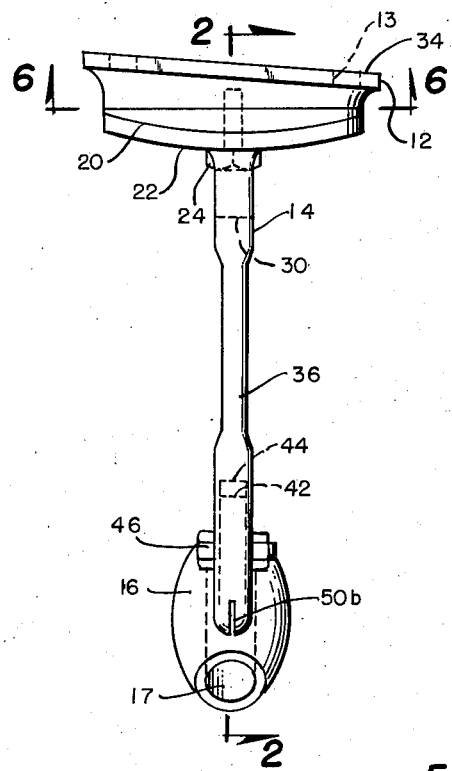
Fig. 1 is an enlarged rear elevation of one illustrative form of a shaft-hanger or strut and bearing assembly constructed in accordance with the principles of this invention.
Figure 2:
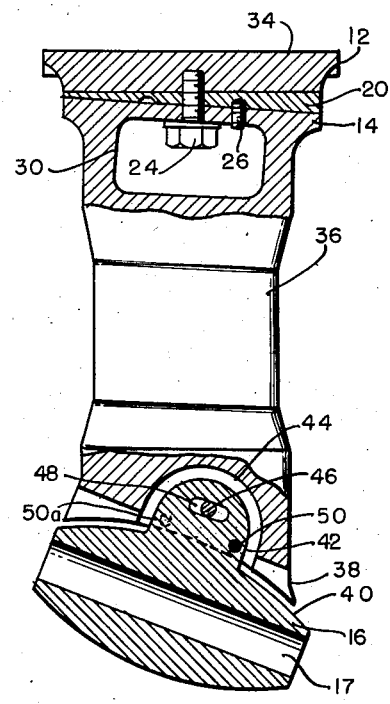
Fig. 2 is a sectional elevational view taken along line 2—2 of Fig. 1.
Figure 3:
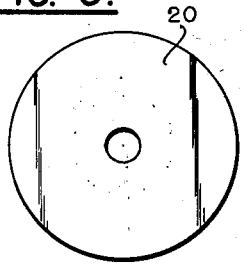
Fig. 3 is a top plan view of the adjusting disc 20 of Fig. 1.
Figure 5:
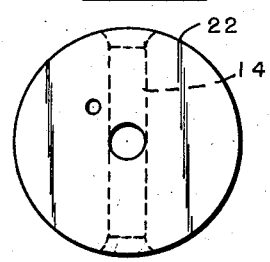
Fig. 5 is a top plan view of the strut member 14 of Fig. 1.
Figure 9:
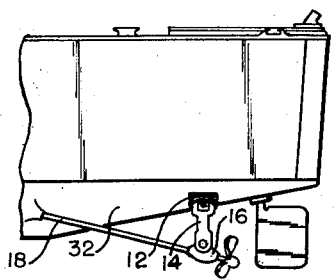
Fig. 9 is a side elevational of a portion of a power boat with one form of the improved strut assembly mounted thereon.

Referring now more particularly to Figs. 1, 2 and 9, there is shown therein one modification of the invention presented for illustrative purposes only, in association with the propeller shaft of a power or motor boat. The strut and bearing assembly comprises a mounting plate 12, having slots or holes 13 for attachment to a supporting surface, a strut 14, and a bearing housing 16, having a bearing sleeve 17. To permit sidewise movement or adjustment of the strut 14 relative to the mounting plate 12 and consequently to the propeller shaft 18 (Fig. 9), a tapered adjusting disc 20 (Fig. 3) is inserted between the mounting plate 12 (Figs. 6 and 7) and the flange 22 (Fig. 5) affixed to the upper extremity of the strut or hanger 14. As hereinafter more fully described, sidewise adjustment of strut 14, or displacements from a position of axial alignment thereof with mounting plate 12, is effected by rotation of adjusting disc 20. To vary the length of the strut and bearing assembly, shims (not shown) may be inserted between the mounting plate 12 and the flange 22, on either side of disc 20. The mounting plate 12, adjusting disc 20, and the strut-flange 22 are rotatably assembled by means of a single bolt 24 threaded into the mounting plate 12, as better shown in Fig. 2. The adjusting disc 20 is secured in the desired rotational orientation relative the strut 14 by means of the set-screw 26. A series of indents 28 (Fig. 10) may desirably be provided on the bottom of the adjusting disc 20 and disposed to cooperate with set-screw 26. A space or clearance 30 is formed adjacent the upward extremity of strut 14 in order to permit easy access to the bolt 24.

In order that identical strut and bearing assemblies may be mounted on either side of the hull 32 (Fig. 9) in the case of a multiple-screw power boat, the mounting plate 12 is provided with a tapered portion 34. Therefore, by rotating the mounting plate 12 180° relative to strut 14, the strut and bearing assembly, in accordance with the present invention, can be adapted readily for either a right- or a left-hand mounting on the hull 32 (Fig. 9) or other inclined surface, thereby making the respective parts of strut and bearing assemblies for multiple-screw power boats completely interchangeable and eliminating additional parts or separately constructed assemblies for such application. Where the mounting plate 12 of the strut or shaft-hanger assembly is intended for mounting only on a single plane surface, the disc 20 may be eliminated and the aforementioned sidewise adjustment effected by rotary movement of mounting plate 12, with the inclined surface 34 thereof in engagement with strut-flange 22. Arcuate slots may be provided for such purpose in place of the mounting holes 13.

Vital parts of the boat, for instance the propeller shaft 18 and the hull 32, are protected from accidental damage, such as that resulting from running aground or striking a submerged object, by providing one of the component parts of the strut assembly with a predeterminedly weakened portion. One arrangement for affording such protection is the provision of a thinned or necked-down section 36 in the strut 14, which is designed to break before severe shocks are transmitted to the hull or propeller shaft, as aforesaid. The thinned section also makes it easier to straighten the strut if bent.

Figure 4:
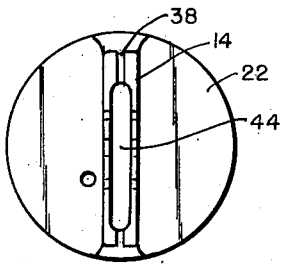
Fig. 4 is a bottom plan view of the strut member 14 of Fig. 1.

The lower extremity of the strut 14 is of arcuate configuration, indicated by the reference character 38, and is adapted to engage a complementary arcuate surface 40 of the bearing housing 16. The strut 14 and bearing housing 16 are assembled by inserting the tab 42 (Fig. 8) affixed to said bearing housing into pocket 44 (Fig. 4) and maintained in engagement by means of the bolt 46 inserted through suitable apertures adjacent the end of strut 14 and in tab 42. For angular adjustment of the bearing housing 16 in a vertical direction relative to the propeller shaft 18 (Fig. 9), tab 42 is provided with an arcuate slot 48 thus permitting the arcuate surface 40 of the bearing housing 16 to move in sliding contact with the complementary arcuate configuration of the strut 14, upon loosening the bolt 46. The bearing housing 16 is secured in any of a number of adjustments by means of the set-screws 50 and 50a. As pointed out in connection with the adjusting disc 20, described heretofore, tab 42 may be provided with a plurality of indents 52 (Fig. 10) adapted to cooperate with set-screw 50 or saw cut 50b for lock clamping action.

Referring now to Fig. 10, in case the circular movement enscribed by the bearing housing 16, when a single adjusting disc 20 is rotated, is not desired, a pair of identical adjusting discs 20a and 20b may be substituted for the single disc 20 (Figs. 1 and 2). By contrarotating the adjusting discs 20a and 20b through correspondingly equal intervals starting from a point where the thinnest parts, or other respective reference points on the discs, coincide, the bearing housing 16 may be made to move linearly from a position relative to such point to a point 180° removed therefrom where the thinnest parts again coincide. Thus the strut 14 and bearing housing 16 may be made to move from side to side, from front to back, or in any direction therebetween, in a straight line. The direction of linear movement, of course, depends upon the arbitrary orientation of the point of coincidence of the thinnest parts of the two adjusting discs, 20a and 20b before the same are contrarotated, and is determined by reference to a point on said discs 180° removed from such coincidence. In the case of power boats wherein the propeller shaft is inclined relative to the strut 14 (Fig. 9) use of the aforementioned front to rear adjustment will effectively vary the length of strut 14 relative to shaft 18 and thus, for the usual adjustments in length of strut 14, eliminate the necessity of inserting shims between strut-flange 22 and mounting plate 12.

In operation, the mounting plate 12 is rotated to either its left- or its right-hand position relative to the hull 32 or to a position intermediate thereto in the case of a single-screw power boat. It is not necessary to exactly align the strut assembly with the propeller shaft 18 before affixing the mounting plate 12 to the hull 32 of the boat, due to the universal adjustability of the strut assembly and the ease of assembling the component parts. It follows then that it is not necessary to replace the assembly due to distortion of one or more of the parts thereof resulting from wear or minor accident. After joining the strut assembly to the hull 32, sidewise alignment of the strut 14 and bearing housing 16 is effected by rotation of the adjusting disc 20, or by contrarotation of discs 20a and 20b (Fig. 10), and securing the set-screw 26 in one of the indents 28 if so provided. Vertical alignment or length of the strut assembly is varied by the addition or subtraction of shims inserted between the disc 20 and the strut-flange 22, or by contrarotating discs 20a and 20b (Fig. 10) such that strut 14 moves substantially from front to back, as described fully heretofore in connection with Fig. 10. The angular disposition, in the vertical direction, of the bearing housing 16 with reference to the propeller shaft 18 is varied by moving the arcuate surface 40 of the bearing housing 16 relative to the complementary arcuate end portion 38 of the strut 14, followed by securing the set-screw 50. The horizontal angularity of the bearing housing 16 relative to the propeller shaft 18 is controlled by rotating the strut 14, with the bearing housing 16 affixed thereto, relative to both the mounting plate 12 and adjusting disc 20. Obviously, by utilization of one or a combination of more than one of the hereindescribed adjustments, the strut and bearing assembly of the invention can be perfectly aligned with the propeller shaft 18 after installation of the assembly on the hull 32. It will likewise be apparent that the limits of adjustability can be changed by varying the dimensions of the parts. For an example the extent of sidewise movement of strut 14 (Fig. 1) can be varied by changing the taper of adjusting disc 20 or by utilizing and rotating together two or more such discs between the mounting plate 12 and the strut-flange 22.

From the foregoing, it will be seen that a novel strut and bearing assembly or shaft-hanger has been disclosed which admits of facile and universal adjustability and which is readily mounted and dismantled. Moreover the component parts are small in number and are easily replaced and realigned relative to the shaft in the event of wear or accident. Although the invention has been described in connection with exemplary applications to power boats for purpose of illustration, it is obvious that the invention can be adapted to other applications, for an example, supporting overhead shafting, and the like.

Numerous modifications will occur to those skilled in the art without departing from the spirit and scope of the invention, and obviously, features thereof can be utilized without a corresponding use of other features. Therefore, the appended claims should be given a latitude of interpretation consistent with the disclosure herein.

Accordingly, what is claimed as new is:

1. A shaft hanger assembly for supporting the propeller shaft of a power boat, said assembly comprising a mounting plate adapted for securing said assembly to the hull of a boat, said plate having a flat upper inclined surface engageable with the hull of a boat, said plate having a flat lower surface angularly disposed with respect to said upper surface, an adjusting disk, said adjusting disk having a flat upper surface and a flat lower surface with the latter surfaces being disposed at an angle with respect to each other, said flat upper surface of said disk engaging said flat lower surface of said plate, a strut, said strut having a flat upper surface engaging the flat lower surface of said disk, bolt means pivotally connecting said strut, disk and plate, means for fixedly connecting said strut, disk and plate in a selected position of relative rotation, said strut, disk and plate being rotatable about an axis extending longitudinally through said shaft hanger assembly, a bearing means for rotatably supporting a shaft for rotation about a second axis extending laterally of the first mentioned axis, mounting means connecting said bearing means to said strut with said bearing means being rotatable about an axis extending transverse the first and second mentioned axes, said means for connecting said bearing means to said strut adjustably fixing said bearing means in a selected position of relative rotation of said bearing means with respect to said strut about said third axis.

2. Apparatus of claim 1 wherein said strut has an arcuate surface concentric with said third axis, said bearing means having a surface concentric with said third axis and bearing against said arcuate surface, said bearing means being movable along said arcuate surface for adjustment of said bearing means with respect to said strut.

3. The apparatus of claim 1 including a second adjusting disk positioned intermediate the first mentioned adjusting disk and said strut, said second adjusting disk having flat upper and lower surfaces inclined at an angle with respect to each other with the upper surface of said second disk bearing against the lower surface of the first disk and said lower surface of said second disk bearing against the upper surface of said strut.

4. The apparatus of claim 1 including said bearing means having an upwardly extending tab, said tab being received within said strut, said means for connecting said bearing means to said strut, comprising a bolt extending through said strut and said tab, the latter bolt being received in an elongated slot in said tab formed concentrically with the said third axis, means spaced from the last named bolt connected to said strut and adjustably engaged with said bearing means and adjustably maintaining said bearing means in a fixed position with respect to said strut.

5. The apparatus of claim 1 including said strut comprising a portion extending intermediate said upper surface and said bearing means, the latter portion being of a strength less than the remaining portions of said assembly.

References Cited in the file of this patent

UNITED STATES PATENTS

| | | |
|---|---|---|
| 296,384 | Bergner | Apr. 8, 1884 |
| 880,415 | Stevens | Feb. 25, 1908 |
| 1,034,110 | Hemmer | July 30, 1912 |
| 1,380,347 | Blume | June 7, 1921 |
| 1,529,897 | List | Mar. 17, 1925 |

FOREIGN PATENTS

| | | |
|---|---|---|
| 105,928 | Austria | Mar. 25, 1927 |